United States Patent
Chen et al.

(10) Patent No.: US 12,101,586 B2
(45) Date of Patent: Sep. 24, 2024

(54) SOUND BRACKET, SOUND BRACKET ASSEMBLY USING SAME AND ITS ASSEMBLY METHOD

(71) Applicant: Ohope Ergonomic Technology Co., Ltd, Shenzhen (CN)

(72) Inventors: Hairu Chen, Shenzhen (CN); Li Xiao, Shenzhen (CN)

(73) Assignee: Ohope Ergonomic Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/136,270

(22) Filed: Apr. 18, 2023

(65) Prior Publication Data
US 2024/0114271 A1 Apr. 4, 2024

(30) Foreign Application Priority Data
Sep. 29, 2022 (CN) .......................... 202222604932.X

(51) Int. Cl.
*H04R 1/02* (2006.01)
*F16M 13/02* (2006.01)

(52) U.S. Cl.
CPC .............. *H04R 1/025* (2013.01); *F16M 13/02* (2013.01)

(58) Field of Classification Search
CPC ....... H04R 1/025; F16M 13/02; F16M 13/022
See application file for complete search history.

(56) References Cited

U.S. PATENT DOCUMENTS

| | | | | |
|---|---|---|---|---|
| 11,009,906 | B1* | 5/2021 | Justin | H04R 1/025 |
| D939,480 | S * | 12/2021 | van Til | D14/224 |
| 11,945,373 | B2* | 4/2024 | Harmon | B60R 11/0217 |
| 2010/0104124 | A1* | 4/2010 | Abraham | H04R 1/028 |
| | | | | 381/332 |
| 2010/0158299 | A1* | 6/2010 | Liu | H04S 3/002 |
| | | | | 381/334 |
| 2021/0356068 | A1* | 11/2021 | Kaplan | F16M 11/04 |
| 2024/0073570 | A1* | 2/2024 | Bergstrøm Graabæk | F16M 13/02 |
| 2024/0121542 | A1* | 4/2024 | Kim | H04R 1/025 |

OTHER PUBLICATIONS https://www.amazon.com/dp/B0BGHMJ3WT?th=1, Date First Available: Sep. 26, 2022, related the proof of sale link.

* cited by examiner

*Primary Examiner* — Monica E Millner
(74) *Attorney, Agent, or Firm* — ScienBiziP, P.C.

(57) ABSTRACT

A sound bracket is provided in the present disclose. The sound bracket comprises a mounting member fixed to the fixing surface; a fixing portion movably arranged on the mounting member; a supporting portion connected to the fixing portion and used for bearing the sound device; an adjusting member movably mounted on the fixing portion and having one end in contact with the mounting member. The fixing portion includes a mounting wall and a connection hole formed on the mounting wall, the connection hole includes a narrow portion and a wide portion communicating with each other, the mounting member is configured to pass through the wide portion and clip into the narrow portion, rotating the adjusting member enables the adjusting member to move relative to the fixing portion, thus applying pressure on the mounting element.

20 Claims, 7 Drawing Sheets

SOUND BRACKET, SOUND BRACKET ASSEMBLY USING SAME AND ITS ASSEMBLY METHOD

RELATED APPLICATIONS

This application claims the benefit of priority to Chinese Patent Application Number 202222604932.X filed on Sep. 29, 2022 in the China National Intellectual Property Administration. The entire contents of the above-identified application are hereby incorporated by reference.

TECHNICAL FIELD

The present disclosure relates to the field of sound fittings, and in particular, to a sound bracket for supporting a sound bar, and a sound bracket assembly using same and its assembly method.

BACKGROUND

In order to save desktop space, sound brackets are generally fixed on a wall for placing a sound device (such as a sound bar). Two or more sound brackets are generally used to support a sound device thereon. However, it may not be not easy for a user to regulate the sound brackets in the same horizontal position, such that the user has to re-punch holes to adjust the position of the sound bracket, thereby increasing the difficulty of installation of the sound brackets.

Therefore, there is need to improve the sound bracket to solve the above problem.

SUMMARY OF DISCLOSURE

In order to overcome the shortcomings of the prior art, this present disclosure relates to a sound bracket mounted on a fixing surface and configured for bearing a sound device on the fixed surface, the sound bracket comprising: a mounting member configured for mounting to the fixing surface; a fixing portion movably arranged on the mounting member; a supporting portion connected to the fixing portion and configured for bearing the sound device; an adjusting member movably mounted on the fixing portion and having one end in contact with the mounting member, wherein the fixing portion comprises a mounting wall arranged opposite to the fixing surface and a connection hole formed on the mounting wall, the connection hole comprises a narrow portion and a wide portion communicating with each other, the mounting member is configured to pass through the wide portion and clip into the narrow portion, the direction of the mounting member passing through the connecting hole is defined as the first direction, and the adjusting member is capable of moving relative to the fixing portion along a second direction perpendicular to the first direction, and, applying pressure on the mounting element in the second direction, so that both the fixing portion and the supporting part move relative to the fixing surface.

In one embodiment, a sound bracket assembly is also provided, and includes at least two sound brackets described above, the at least two sound brackets are separately disposed at two sides of the sound.

In one embodiment, a sound mounting method using the sound bracket is also provided, the method at least includes the flowing steps: mounting the mounting member of the sound bracket to the fixing surface along a first direction, fixing the sound device on the supporting portion of the sound bracket; detecting whether the sound device is horizontally arranged on the at least two sound brackets; rotating the adjusting member to enable the adjusting member to move towards the fixing portion, and then applying pressure on the mounting member in a second direction perpendicular to the first direction to change the position of the fixing portion relative to the fixing surface.

Compared with the prior art, after a plurality of sound bracket 1 are mounted on a fixing surface (usually a wall), if the position of one of the sound bracket 1 needs to be adjusted, the sound bracket 1 can be lifted up and down in the second direction D2 (the vertical direction here) only by rotating the adjusting member 50, thus, the plurality of sound bracket 1 are located at the same horizontal position, and the user is prevented from re-punching to adjust the positions of the sound brackets 1, the use experience of a user is improved.

DETAILED DESCRIPTION

The embodiments of the present disclosure will be further described in detail with reference to FIGS. 1-3, so that the technical solutions of the present disclosure can be easily understood and grasped.

In the present embodiment, it should be understood that, orientation or position relationships indicated by terms such as "middle", "upper", "lower", "top", "right side", "end", "front", "back", and the like are orientation or position relationships based on those shown in the figures, which are only used to facilitate description of the present disclosure, rather than indicating or implying that the device or element referred to must have a specific orientation and be constructed and operated in a specific orientation, and therefore cannot be construed as limitations to the present disclosure.

Figure 1:
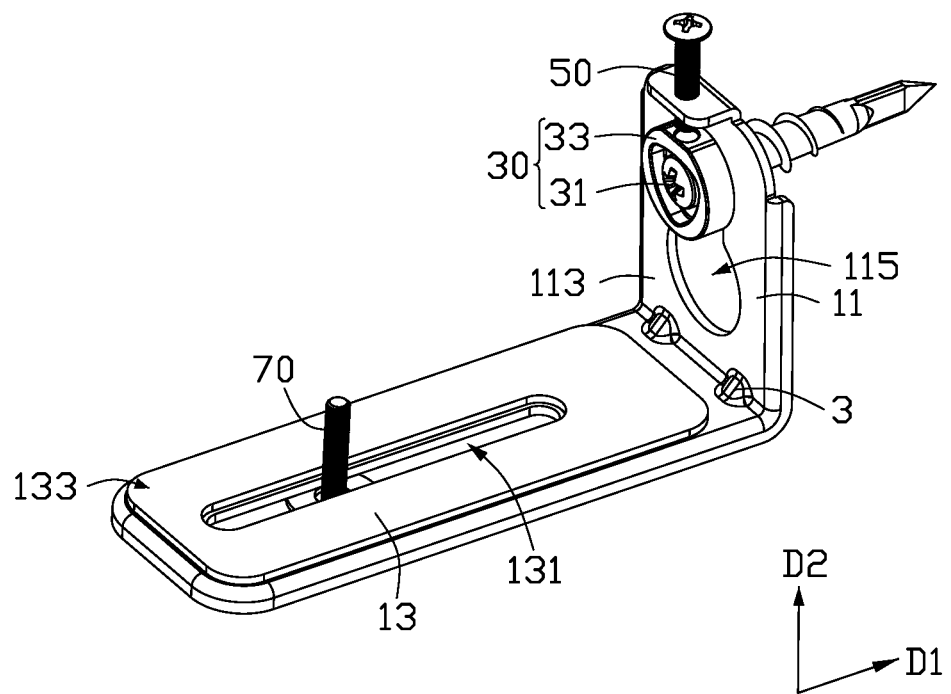
FIG. 1 is a perspective view of a sound bracket according to an embodiment of the present disclosure.
Figure 2:
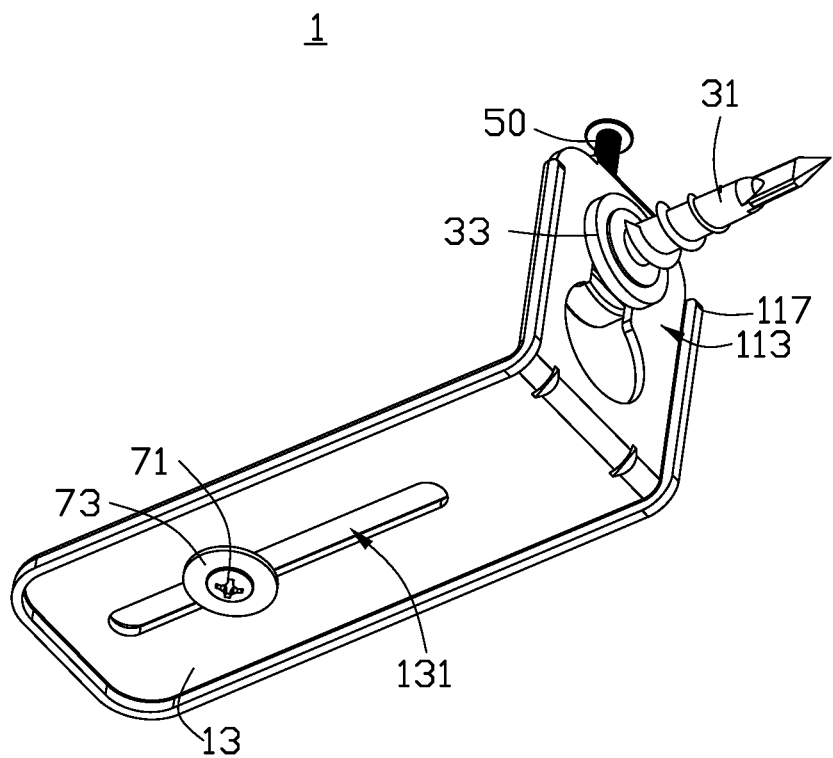
FIG. 2 is a perspective view in another viewing angle of the sound bracket of FIG. 1.
Figure 3:
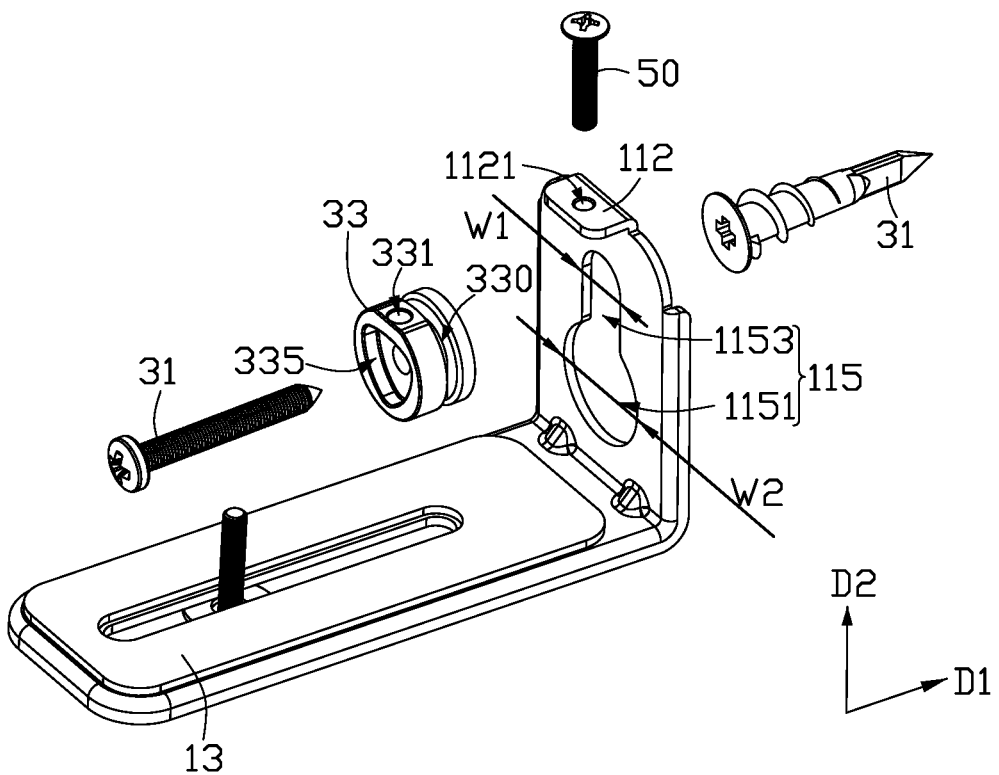
FIG. 3 is an exploded view of the sound bracket shown in FIG. 1.

As shown in FIGS. 1 to 3, a sound bracket 1 can be mounted on a fixing surface (not shown), and is configured for bearing a sound device 2, such as a sound bar, on the fixing surface. The sound bracket 1 includes a mounting member 30, a fixing portion 11, a supporting portion 13 and an adjusting member 50. The supporting portion 13 connects with the fixing portion 11 and is configured to support the sound device 2.

The fixing portion 11 is movably arranged on the mounting member 30, that is, the position of the mounting member 30 in the fixing portion 11 can be regulated. The fixing portion 11 and the supporting portion 13 are formed with a L-shaped portion (not labeled), and therefore the sound device can be supported by the L-shaped portion. The sound bracket further includes an adjusting member 50 movably mounted on the fixing portion 11 and configured to regulate the position of the sound bracket 1 relative to the horizontal plane, e.g. the ground. The adjusting member 50 has one end in contact with the mounting member 30 and provides a force to the mounting member 30 to regulate the position of the mounting member 30 relative to the fixing portion 11.

The fixing portion 11 includes a mounting wall 113 arranged facing to the fixing surface and a connection hole 115 formed on the mounting wall 113. The mounting wall 113 forms as one side of the L-shaped portion. The mounting member 30 is fixed to the fixing surface via the connection hole 115. The connection hole 115 includes a narrow portion 1153 having a first lateral width W1 and a wide portion 1151 communicating with each other and having a second lateral width W2 being greater than the first lateral width W1. The mounting member 30 can pass through the wide portion 1151 along a first direction D1 and then enters and clips into the narrow portion 1153. In this embodiment, the narrow portion 1153 is located above the wide portion 1151 and combines with the wide portion 1151 to forms a shape similar to the number "8". Alternatively, the narrow portion 1153 and the wide portion 1151 can also be other shapes.

The adjusting member 50 is positioned to the fixing portion 11 and is capable of moving along a second direction D2 perpendicular to the first direction D1, and simultaneously the end of the adjusting member 50 moves in a direction close to the mounting member 30 until the end of the adjusting member 50 contacts against a portion of the mounting member 30. Then, the end of the adjusting member 50 continues to apply pressure to the mounting member 30 in the second direction D2 following with the movements of the adjusting member 50, so that the fixing portion 11 and the supporting part 13 move relative to the fixing surface.

The adjusting member 50 has an user operation portion which allow the user to regulate the moving distance of the adjusting member 50 along the second direction 50. In this embedment, the adjusting member 50 can be for example a bolt, the head of the bolt can be regarded as the user operation portion, and the moving distance of the adjusting member 50 is regulated by rotating the head of the bolt.

When a plurality of sound brackets 1 are mounted on the fixing surface (usually a wall), the user can easily install these sound brackets 1 in a same horizontal plane using the function of the adjusting member 50. In detail, if the position of one of the sound bracket 1 needs to be adjusted, the sound bracket 1 can be lifted up and/or down in the second direction D2 (a vertical direction here) only by rotating the adjusting member 50, thus, the plurality of sound brackets 1 are located at the same horizontal position, and there is no need to re-punching fixing holes to adjust the positions of the sound brackets 1, the use experience is improved.

Figure 4:
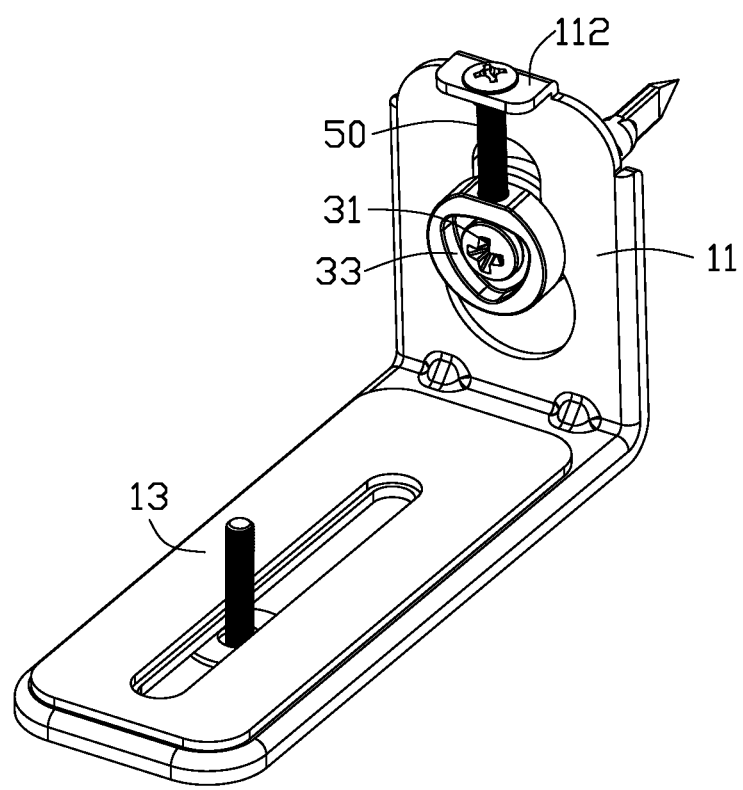
FIG. 4 is a perspective view showing a use state of the sound bracket shown in FIG. 1.

A maximum moving distance of the adjusting member 50 is set to allow that the mounting element 30 only moving in the narrow portion 1153 without entering the wide portion 1151. Referring to FIG. 4, the adjusting member 50 is a first bolt, and the maximum moving distance of the first bolt along the second direction D2 is less than ½ of a length of the narrow portion 1153 in the second direction D2. FIG. 4 shows the status of the sound bracket 1 when the adjusting member 50 has moved with the maximum moving distance in this embodiment. Limitation of the maximum moving distance of the adjusting member 50 can prevent the mounting member 30 from losing connection with the wide portion 1151, that is, it effectively prevents the fixing portion 11 from falling off the mounting member 30. In this embodiment, the maximum moving distance of the first bolt in the second direction D2 is 10 millimeters, but is not limited thereto.

Referring to FIG. 3, the end of the fixing portion 11 away from the supporting portion 13 is provided with an adjusting installation portion 112, which is parallel with the supporting portion 13 and extends in the same direction with the supporting portion 13. The adjusting member 50 is movably mounted on the adjusting installation portion 112. A threaded hole 1221 is formed through the thickness of the adjusting installation portion 112, and the adjusting member 50 is threadedly connected to the threaded hole 1221.

The mounting member 30 further comprises a second bolt 31 and a clamping portion 33. The fixing portion 11 is fixedly mounted on the fixing surface by means of the first bolt 31. The clamping portion 33 is configured to clamp the second bolt 31, and at least a part of the clamping portion 33 is configured to abut against the adjusting member 50. The clamping portion 33 can has for example a cylindrical shape, a fixing hole 335 is formed in the middle of the clamping portion 33, and the first bolt 31 penetrates through the fixing hole 335. A guiding groove 330 is provided on an outer periphery of the clamping portion 33 and is formed by recessing the outer periphery of the clamping portion 33 towards an axis, a bottom wall of the guiding groove 330 engages with an edge portion of the narrow portion 1153.

In this embodiment, a clamping slot 331 can be a recess formed on a side of the clamping portion 33 close to the adjusting installation portion 112, and an end of the adjusting member 50 is engaged with the clamping slot 331. Thus, the end portion of the adjusting member 50 can prevent from disengaging from the engagement portion 33 during adjustment.

Referring also to FIG. 1, the adjusting installation portion 112 is located above the mounting member 30, and the clamping portion 33 is located below the adjusting installation portion 112.

Referring also to FIG. 2, two sides of the mounting wall 113 are provided with blocking protrusions 117 protruding towards a direction away from the supporting portion 13. The clamping portion 33 enters and clips into the narrow portion 1153 and protrude from the mounting wall 113 as well. The blocking protrusions 117 protrude from the mounting wall 113 more than the clamping portion 33, so that the blocking protrusions 117 are in contact with the fixing surface, and the clamping portion 33 is not in contact with the fixed surface.

An opening 131 is formed through the supporting portion 13, the sound bracket further comprises a locking portion 70, and one end of the locking portion 70 passes through the opening 131 and is fixedly connected to the sound. The locking portion 70 comprises a locking member 71 and a gasket 73, one end of the locking member 71 passes through the gasket 73 and is fixedly connected to the sound via the opening 131, and the gasket 73 is located below the supporting portion 13.

An adhesive layer 133 can be provided on a surface of the supporting portion 13 and is used for adhering to the bottom of the sound device 2.

In this embodiment, at least one reinforcing rib 3 is disposed at a joint between the supporting portion 13 and the fixing portion 11. The reinforcing rib 3 help to improve the strength between the supporting portion 13 and the fixing portion 11, thereby improving the supporting ability of the supporting portion 13.

In this embodiment, the supporting portion 13 and the fixing portion 11 are integrally formed.

Figure 5:
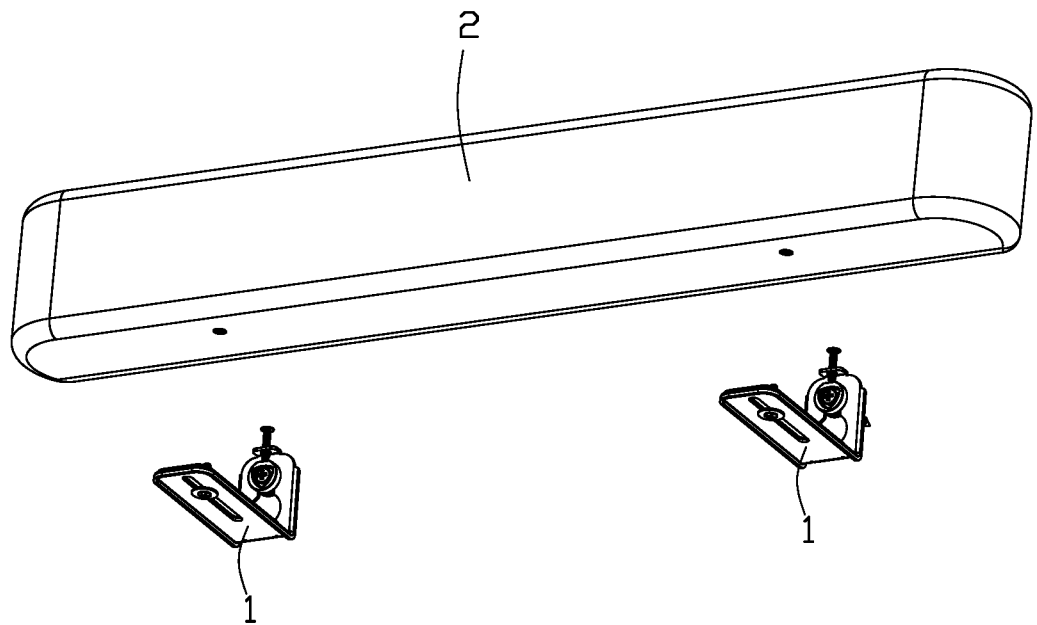
FIG. 5 is a perspective view of a sound bracket assembly having two of the sound brackets of FIG. 1 to support a sound bar.

FIG. 5 shows a sound bracket assembly of the present disclosure. The sound bracket assembly comprising at least two sound brackets 1, and the at least two sound bracket 1 are separately disposed at two sides of the sound device 2.

In this embodiment, the sound bracket system further comprising a level instrument (not shown) which may be used when regulating the horizontal levelness of the sound device. The level instrument is used to be placed on the sound device 2, so that the user can conveniently determine the horizontal levelness of the sound device 2.

Figure 6:
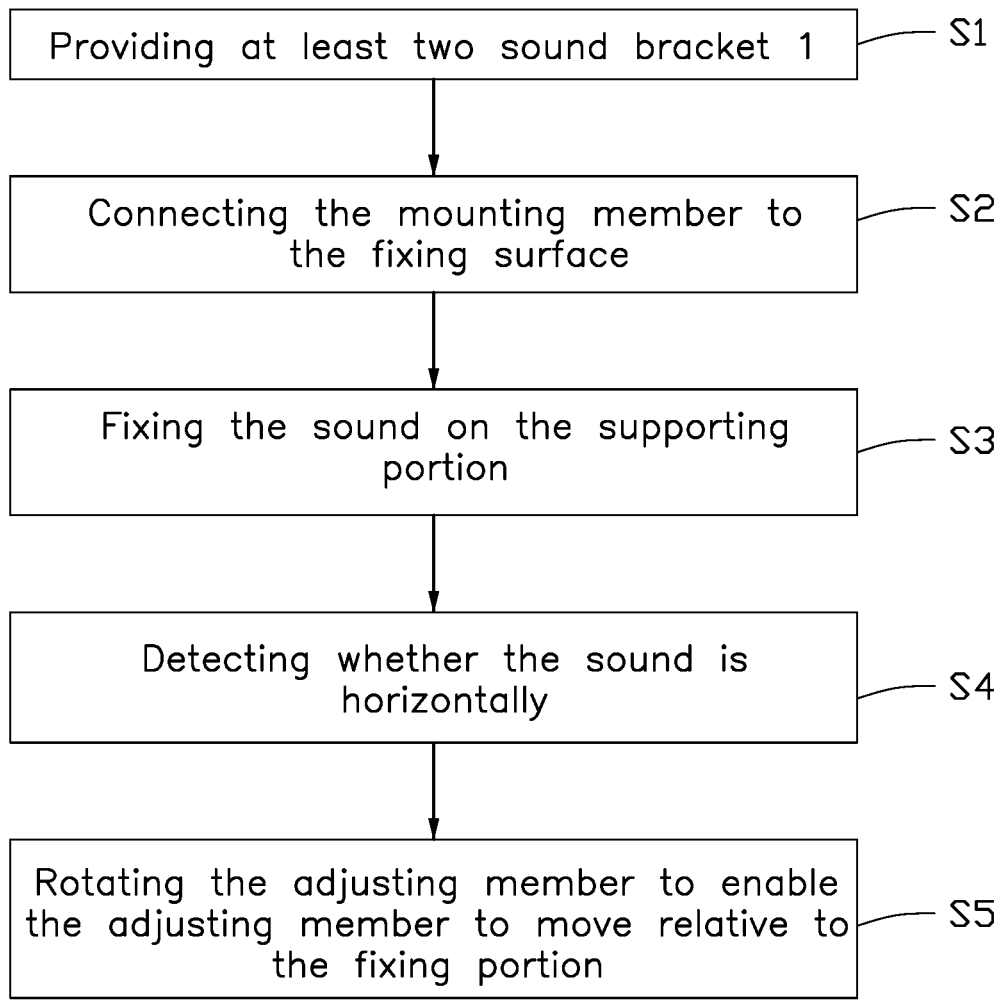
FIG. 6 is a flow chart of a sound assembly method according to the present disclosure.

Referring to FIG. 6, a sound mounting method using the sound bracket 1 is shown. The method comprising:

S1: providing at least two sound bracket 1;
S2: mounting the mounting member 30 of the sound bracket 1 to the fixing surface along a first direction D1;
S3: fixing the sound device on the supporting portion of the sound bracket;
S4: detecting whether the sound device is horizontally arranged on the at least two sound brackets.
S5: rotating the adjusting member to enable the adjusting member 50 to move relative to the fixing portion 11, thus applying pressure on the mounting member 30 in a second direction D2 perpendicular to the first direction D1, so that the fixing portion 11 and the supporting part 13 move relative to the fixing surface until the sound device 2 is horizontally arranged on the at least two sound brackets 1.

Figure 7:
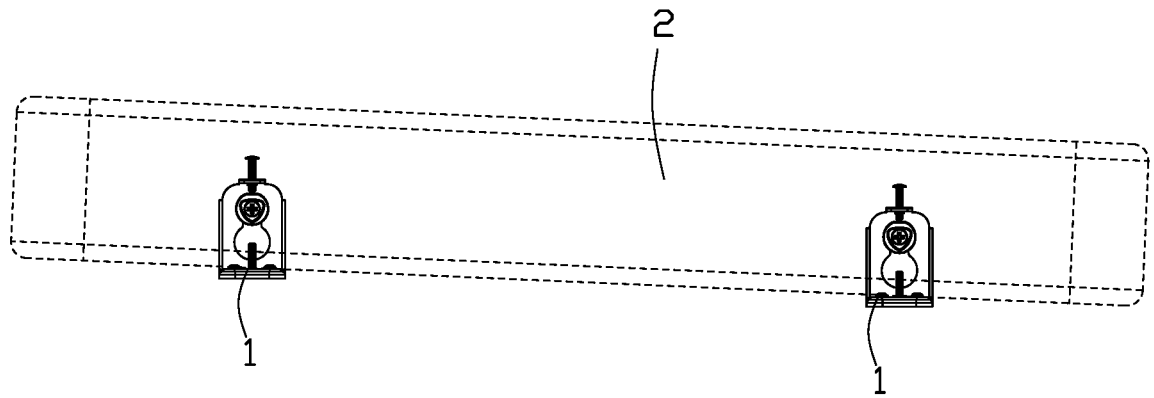
FIG. 7 is a process view of the sound assembly method shown in FIG. 6.
Figure 7:
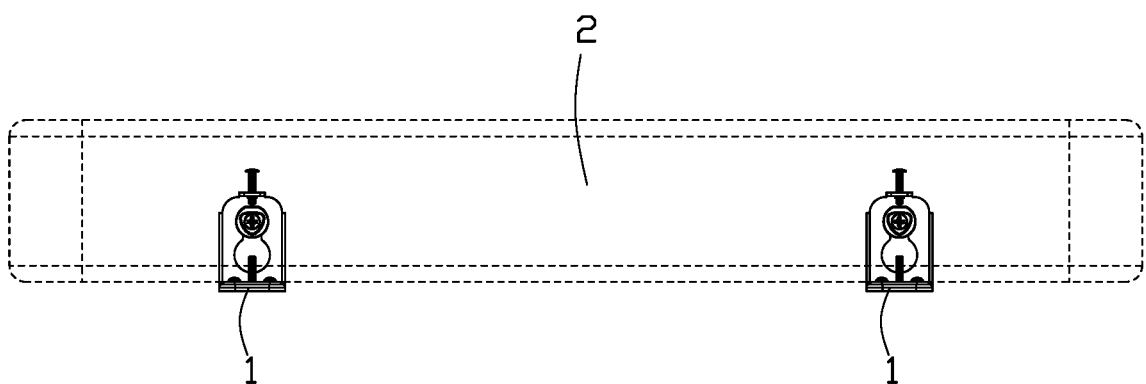

In the step S5, as shown in FIG. 7, the upper part shows a state in which the sound device 2 is not horizontally disposed, where a right side of the sound device 2 is lower and a left side of the sound device 2 is higher. In this case, by adjusting the adjusting member 50 of the right sound bracket, the right sound bracket is lifted in the second direction D2 (namely, the vertical direction) until the sound device 2 is horizontally arranged as shown in the lower part of FIG. 7.

Compared with the prior art, after a plurality of sound bracket 1 are mounted on a fixing surface (usually a wall), if the position of one of the sound bracket 1 needs to be adjusted, the sound bracket 1 can be lifted up and down in the second direction D2 (the vertical direction here) only by rotating the adjusting member 50, thus, the plurality of sound bracket 1 are located at the same horizontal position, and the user is prevented from re-punching to adjust the positions of the sound brackets 1, the use experience of a user is improved.

The above embodiments are only preferred embodiments of the present disclosure, and cannot limit the scope of protection of the present disclosure. Any substantive change and replacement made by a person skilled in the art on the basis of the present disclosure belongs to the scope of protection of the present disclosure.

What is claimed is:

1. A sound bracket mountable on a fixing surface and configured for bearing a sound device on the fixed surface, the sound bracket comprising:
a mounting member configured for mounting to the fixing surface;
a fixing portion movably arranged on the mounting member;
a supporting portion connected to the fixing portion and configured for bearing the sound device; and
an adjusting member movably mounted on the fixing portion and having one end in contact with the mounting member,
wherein the fixing portion comprises a mounting wall arranged opposite to the fixing surface and a connection hole formed on the mounting wall, the connection hole comprises a narrow portion and a wide portion communicating with each other, the mounting member is configured to extend through the wide portion and clip into the narrow portion, a direction of the mounting member extending through the connecting hole is defined as the first direction, and
the adjusting member is movable relative to the fixing portion along a second direction perpendicular to the first direction, and, when the end of the adjusting member is in contact with the mounting member, the adjusting member applies pressure on the mounting element in the second direction, so that both the fixing portion and the supporting part move relative to the fixing surface.

2. The sound bracket according to claim 1, wherein a maximum moving distance of the adjusting member in the second direction is set such that the mounting element moves into the narrow portion but not into the wide portion.

3. The sound bracket according to claim 1, wherein the adjusting member is a first bolt, and a maximum moving distance of the first bolt in the second direction is less than ½ of a length of the narrow portion in the second direction.

4. The sound bracket according to claim 3, wherein the maximum moving distance of the first bolt in the second direction is 10 millimeters.

5. The sound bracket according to claim 1, wherein an end of the fixing portion away from the supporting portion is provided with an adjusting installation portion, which is parallel with the supporting portion and extends in a same direction with the supporting portion, and the adjusting member is movably mounted on the adjusting installation portion.

6. The sound bracket according to claim 5, wherein a threaded hole is formed through the adjusting installation portion, and the adjusting member is threadedly connected to the threaded hole.

7. The sound bracket according to claim 1, wherein the mounting member comprises a second bolt, and the fixing portion is fixedly mounted on the fixing surface by means of the first bolt.

8. The sound bracket according to claim 7, wherein the mounting member comprises a clamping portion configured for clamping the second bolt, and at least a part of the clamping portion is configured to abut against the adjusting member.

9. The sound bracket according to claim 8, wherein the adjusting installation portion is located above the mounting member, and the clamping portion is located below the adjusting installation portion.

10. The sound bracket according to claim 8, wherein the clamping portion has a cylindrical shape, a fixing hole is formed in the clamping portion, and a first bolt penetrates through the fixing hole, a guiding groove is provided on an outer periphery of the clamping portion, and is formed by recessing the outer periphery of the clamping portion,
a bottom wall of the guiding groove engages with an edge portion of the narrow portion.

11. The sound bracket according to claim 9, wherein a clamping slot is recessed on a side of the clamping portion close to the adjusting installation portion;
an end of the adjusting member is engaged with the clamping slot.

12. The sound bracket according to claim 8, wherein two sides of the mounting wall are provided with blocking protrusions protruding towards a direction away from the supporting portion, and the clamping portion enters and clips into the narrow portion and protrude from the mounting wall as well, and the blocking protrusions protrude from the mounting wall more than the clamping portion, such that the blocking protrusions are in contact with the fixing surface, and the clamping portion is not in contact with the fixed surface.

13. The sound bracket according to claim 8, wherein an opening is formed through the supporting portion, the sound bracket further comprises a locking portion, and one end of the locking portion extends through the opening and is fixedly connected to the sound device.

14. The sound bracket according to claim 13, wherein the locking portion comprises a locking member and a gasket, one end of the locking member extends through the gasket and the opening and is fixedly connected to the sound device, and the gasket is located below the supporting portion.

15. The sound bracket according to claim 1, wherein the supporting portion further comprises an adhesive layer protruding from a surface of the supporting portion, the adhesive layer is configured for adhering to a bottom of the sound device.

16. The sound bracket according to claim 1, wherein the supporting portion and the fixing portion are integrally formed.

17. The sound bracket according to claim 1, wherein at least one reinforcing rib is disposed at a joint between the supporting portion and the fixing portion.

18. A sound bracket assembly, comprising at least two of the sound brackets according to claim 1, wherein the at least two sound brackets are separately disposed at two sides of the sound device.

19. The sound bracket assembly according to claim 18, further comprising a level instrument.

20. A sound mounting method using at least two of the sound brackets of claim 1, the sound mounting method comprising:

mounting the mounting member of each of the at least two sound brackets to the fixing surface along the first direction;

fixing the sound device on the supporting portion of each of the at least two sound brackets;

detecting whether the sound device is horizontally arranged on the at least two sound brackets;

rotating the adjusting member to enable the adjusting member to move towards the fixing portion, and then applying pressure on the mounting member in the second direction perpendicular to the first direction to change a position of the fixing portion relative to the fixing surface.

* * * * *